April 26, 1955
H. F. KENNISON
2,707,003
PIPE SECTIONS WITH MOULDED SPIGOTS
Filed July 15, 1949
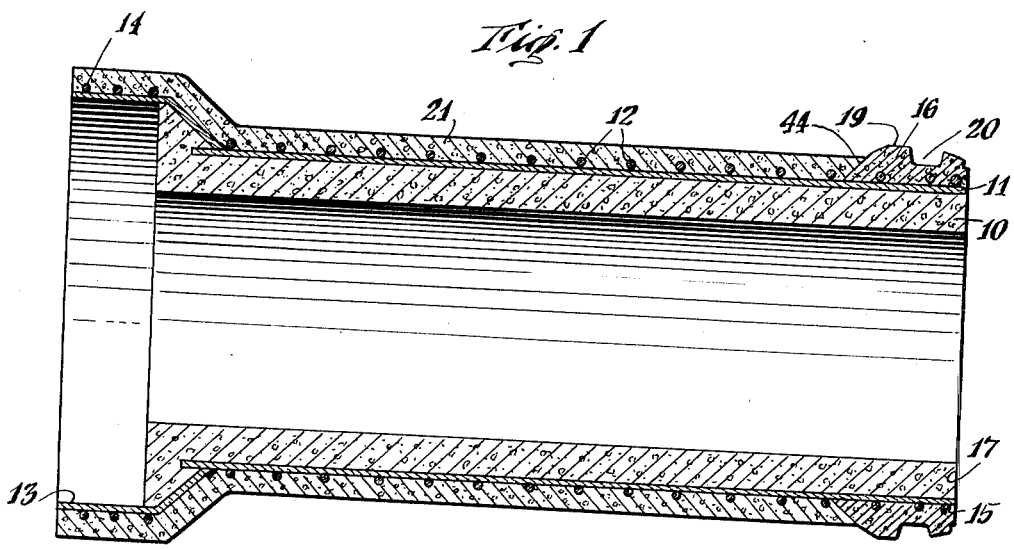
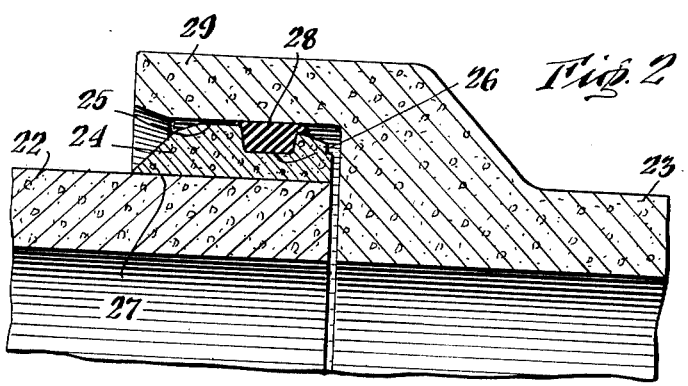
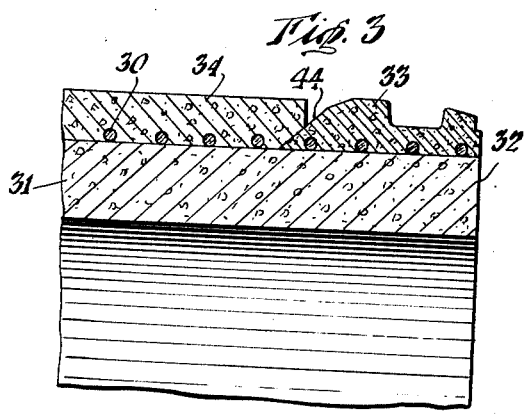
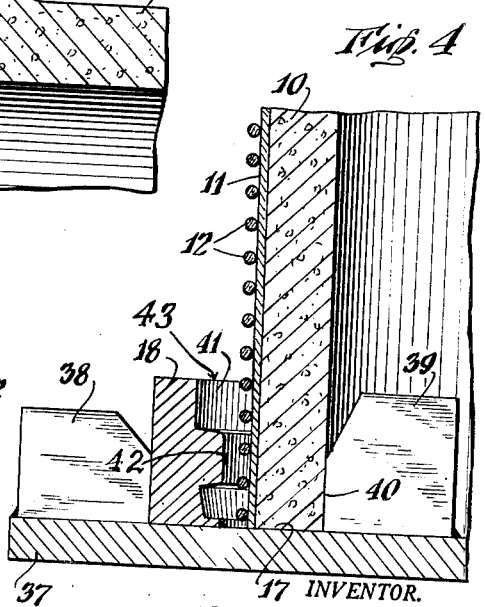
INVENTOR.
Hugh F. Kennison
BY Robert S. Dunham
ATTORNEY

United States Patent Office 2,707,003
Patented Apr. 26, 1955

2,707,003

PIPE SECTIONS WITH MOULDED SPIGOTS

Hugh F. Kennison, Verona, N. J., assignor to Lock Joint Pipe Company, East Orange, N. J., a corporation of New Jersey Application July 15, 1949, Serial No. 105,014

1 Claim. (Cl. 138—80)

This invention relates to pipes.

A variety of concrete pipes which has successfully met working conditions including extremely high internal fluid pressures consists of a hollow concrete core which is surrounded by a water-tight sleeve of metal and a prestressed winding of wire which is wrapped helically around the metallic sleeve and permanently anchored. The tensioned winding of wire provides circumferential compressional stresses in the metallic sleeve and concrete core. The wrapping of wire is then covered by a protecting layer of concrete. A pipe section constructed in this manner can be designed to withstand high internal pressures quite economically compared with other forms of high pressure pipes.

It is manifest that the joints which connect pipe sections of a pipe line must be pressure-proof for at least the amount of pressure which the pipe section is designed to withstand. A form of joint which has proven to be particularly efficacious is of the bell-and-spigot variety and includes a form of spigot providing a circumferential groove opening outwardly and a rubber gasket forcibly contained therein by an outside pipe section constituting a complementary joint member. For this type of joint the engaging or opposing surfaces of the spigot and bell members and the groove have to be carefully dimensioned so that the gasket will be uniformly compressed and the many joints in a pipe line will be equally resistant to failure. Inasmuch as the gasket is incompressible the cross-sectional areas of the gasket and of the groove have to be carefully predetermined.

There can be very little departure between the calculated capacity of the groove, the volume of the gasket, and the diameters of the telescoping bell and spigot surfaces if high pressure-proof sealing conditions are to be obtained. Because of this it has been a practice to attach to the end of a pipe section a relatively thick ring of steel having correct proportions with respect to its external diameter and the gasket-receiving groove. While the heavy steel spigot ring thus provided has all the attributes required for forming a joint which is capable of withstanding high pressures, the concrete within the ring is not subjected to the compressive stresses existing within the main conduit portion of the pipe section rearward of the ring. As a result the concrete interior of the pipe section is subjected to shearing stresses adjacent the termination of the wire-winding and the rear of the spigot ring with attendant weakness and possible failure of the interior concrete adjacent the spigot before internal working pressures are attained. It is among the objects of the present invention to provide a prestressed wire-wound pipe section with an inner joint member or spigot and in which the concrete interior of the pipe section has substantially the same stress pattern throughout its length.

An object of the invention is to provide a prestressed concrete pipe section, with or without a metallic cylinder underlying a winding of tensioned wire, in which the winding of wire extends within the limits of and beyond the bearing and sealing regions of the spigot of the pipe section.

Another object of the invention is to provide a method for applying a spigot ring of cementitious material to a concrete pipe section which has previously been fabricated except for the completion of the spigot. Other objects of the invention are contained in the following description and claim and are illustrated in the accompanying drawings which show preferred embodiments of the principle of the invention and the best mode of applying the same.

In the drawings:

Fig. 1 is a longitudinal section of a high pressure pipe section containing a steel cylinder and a lining of concrete which are maintained in circumferential compression by a helical wrapping of highly tensioned wire;

Fig. 2 is a detail showing portions of joined pipe sections of concrete which embody the invention;

Fig. 3 illustrates a spigot end of a high pressure concrete pipe section embodying the invention; and Fig. 4 shows how a prefabricated pipe section may be readied for the application of a spigot ring.

In all forms of pipe sections employing the present invention the main body of concrete of the pipe section which constitutes the conduit is moulded or cast and cured before the spigot ring is applied. In the pipe section illustrated in Fig. 1 the main body of concrete constitutes the lining 10 which is surrounded by a metallic cylinder or sleeve 11. The sleeve 11 is fluid-tight and is usually made of steel. The concrete lining 10 may be placed or moulded against the interior of the sleeve 11 in any manner desired, such as by casting in a stationary mould or by rotating the sleeve 11 on its axis in a centrifugal machine. After the concrete has cured a helical wrapping of highly tensioned wire 12 is wound about the full length of the sleeve and anchored. The tension in the wire may range upwards to and above 200,000 pounds per square inch.

In the pipe section illustrated in Fig. 1, the steel tube 11 has welded thereto a steel bell ring 13 which constitutes the interior of the bell of the pipe section, but it will be understood that the invention is applicable to a pipe section having two spigot ends which can be joined to other pipe sections by an exterior pipe section in the form of a sleeve having an interior diameter corresponding to the interior diameter of the bell member 13.

The wire winding 12 is applied so as to extend substantially from end to end of the pipe section which, in the pipe section shown in Fig. 1, includes the last turn or coil 14 overlying the bell ring 13 and the last turn or coil 15 overlying the spigot end of the steel sleeve 11. As the tensioned wire wrapping overlies the full length of the interior concrete body 10, it is evident that all of the concrete body is circumferentially compressed. All of the turns or coils of wire are equally stressed and therefore the circumferential compression in the concrete body 10 is the same throughout its length. Except for a protective coating the conduit portion of the pipe section is completely fabricated at this stage of manufacture.

The joining portion or spigot 16 of the pipe section is then formed about the pipe section adjacent an end 17, as illustrated in Fig. 1. The spigot ring 16 is an integral ring of cementitious material or of other originally plastic and subsequently hardened material, which is moulded in place over the outer wall surface and wire wrapping. This ring may be applied by tamping a rich concrete mix of low water content against the exterior of the steel sleeve 11 and within a suitable mould ring 18 (Fig. 4) which is located concentrically to the axis of the pipe section. The concrete mix is consolidated into a strong and dense mass and bonded to the exterior of the pipe section and the wire wrapping. In general, concrete and mortar are preferred, but other plastic materials which are mouldable and become hard and tough enough to withstand wear may be used.

The mould ring 18 serves as a means for providing a smooth cylindrical bearing surface 19 having the desired outside diameter and a groove 20 of uniform depth and width throughout its circumference. As has been pointed out hereinabove, the dimensional characteristics of the functional portions of the mould ring are very important to the obtaining of a joint which will be fluid-tight under high pressure conditions. These characteristics can be assured by forming the spigot ring in the manner described.

The pipe is finished by projecting plastic mortar or concrete onto the exterior of the steel sleeve 11 and over the bell member 13 until a sufficient depth of covering 21 is obtained to afford adequate protection for the wrapping of wire 12.

In Fig. 2 there is illustrated a joint of a form of pipe section having a straight-walled conduit portion which may be moulded in any well-known manner. The spigot end of one pipe section 22, is shown connected to the bell end of another pipe section 23. Each of the pipe sections has complementary bell and spigot ends. As in the case of the pipe section previously described, the main conduit portions of the pipe sections are cured before the spigot ring 24 is applied.

The spigot ring 24 constitutes a monolithic ring of concrete or of other originally plastic and subsequently hardened material and is formed by employing a mould which has properly dimensioned moulding surfaces for providing the dimensional characteristics desired. The material used in forming the spigot ring 24 is tamped into place in bonded relationship with the exterior of the spigot end of the pipe which is normally rough enough to form interengaging gripping surfaces. Since the spigot ring is moulded it is apparent that the trueness and the dimensional accuracy of the spigot bearing surface 25 and of the groove 26 can be assured regardless of any irregularity in the outer wall surface 27 of the pipe section, such as lack of concentricity or out-of-roundness.

The closed joint contains a gasket of rubber or of rubber-like material 28 which is deformed and contained within the groove 26 by the interior of the bell 29. The conduit portion of the pipe section may be formed wholly of concrete or may contain steel reinforcing, depending upon the strength of wall which is required.

As in the case of the prestressed concrete cylinder pipe section illustrated in Fig. 1 of the accompanying drawing, a plain concrete pipe section can be strengthened by a wrapping of tensioned wire. In Fig. 3 there is illustrated a portion of such a pipe section. The wrapping of tensioned wire 30 is applied and attached directly to the exterior of the hollow core of concrete 31, and as described with reference to the pipe section illustrated in Fig. 1, the wire wrapping extends adjacent to the spigot end 32 of the concrete core. The monolithic ring of concrete 33 is formed in bonded relationship with the exterior of the core 31 in the manner previously described. The remainder of the pipe section is then covered by a coating of concrete 34 which abuts and preferably overlaps the rear sloping edge of the spigot ring.

The mould ring 18 may constitute a split ring of two semi-circular segments with its finished mould-forming surface on the inside. A section of such a ring is illustrated in Fig. 4. The mould ring 18 is removably mounted upon a base plate 37 and is centered by means of three or more equally spaced centering lugs, one of which is illustrated at 38. The end 17 of the pipe section is supported on the base plate 37 and the pipe section is centered with respect to the mould ring by three or more lugs 39 having edges 40 for engaging the interior of the pipe section. The interior surface of the mould ring 18 is carefully finished smooth and to proper dimensions. The cylindrical surface 41 forms the bearing surface 19 and the rib 42 forms the groove 20. The annular mould space 43 is filled with a stiff mix of concrete and consolidated by the use of tools. The rear portion 44 of the spigot ring can be finished by hand in one or more tapering surfaces. After the concrete spigot ring has cured sufficiently to form a firm bond with the core or pipe section, the pipe section and the mould ring 18 are raised from between the two sets of centering lugs 38 and 39 and the mould ring is split by separating the two halves of the ring.

What is claimed is:

In a pipe section, a conduit having substantially parallel inner and outer wall surfaces extending from one end thereof at which the conduit forms a part of a spigot for the pipe section, a winding of tensioned wire about said conduit and extending over said conduit from adjacent the spigot end of the conduit and maintaining said conduit circumferentially compressed, a ring of originally plastic and subsequently hardened cementitious material forming an annular enlargement around said conduit in contact with the outer wall surface of said conduit and covering turns of said winding of wire adjacent to said end of said conduit, said ring constituting a permanent part of said spigot with an outer diameter considerably greater than the diameter of the said outer wall surface of said conduit and having a peripheral groove opening outwardly from said ring for receiving a gasket, the minimum diameter of said groove being greater than the maximum diameter of said wire winding as measured through the axis of said conduit.

References Cited in the file of this patent

UNITED STATES PATENTS

| | | |
|---|---|---|
| 1,133,313 | Parmley | Mar. 30, 1915 |
| 1,357,311 | Buente | Nov. 2, 1920 |
| 1,951,512 | Jewell | Mar. 20, 1934 |
| 2,234,643 | Grant | Mar. 11, 1941 |
| 2,325,469 | Boissou | July 27, 1943 |
| 2,566,689 | Whiting | Sept. 4, 1951 |